Aug. 23, 1960    N. C. BUTLER    2,949,783
GRAVITY SENSING DEVICE
Filed Oct. 28, 1957
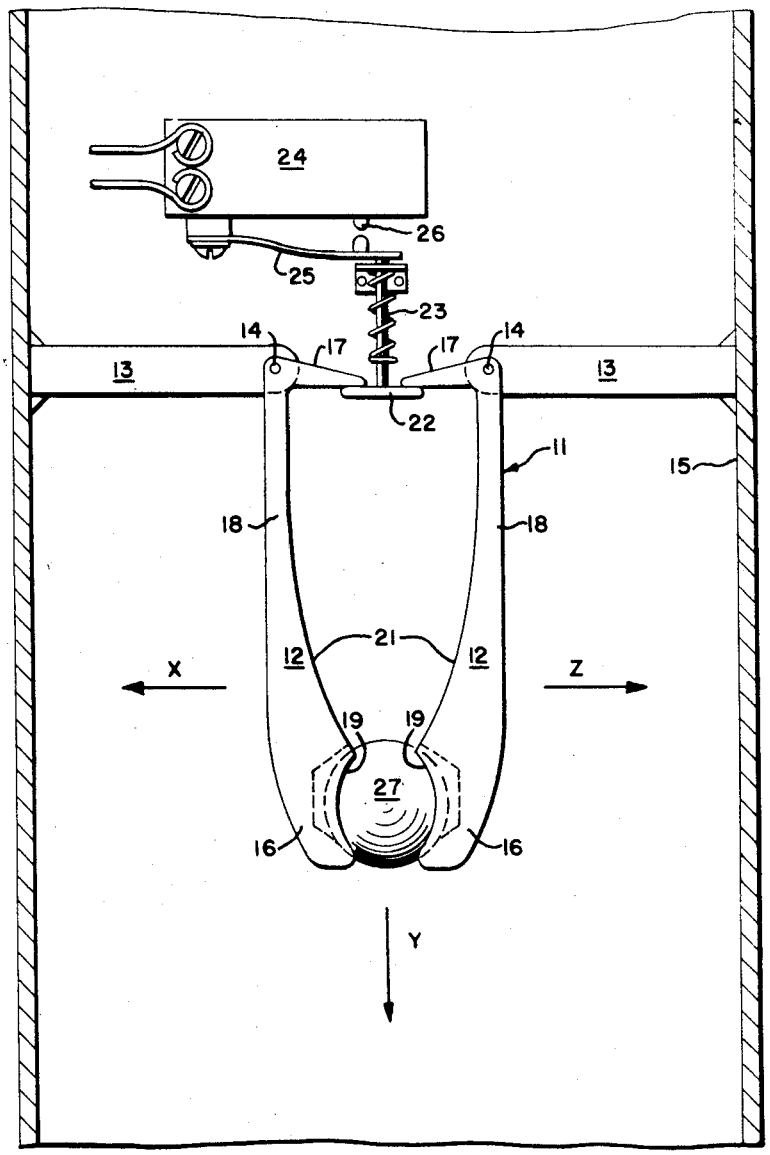
INVENTOR.
NORMAN C. BUTLER
BY
ATTYS.

United States Patent Office 2,949,783
Patented Aug. 23, 1960

2,949,783
GRAVITY SENSING DEVICE

Norman C. Butler, Washington, D.C., assignor to the United States of America as represented by the Secretary of the Navy Filed Oct. 28, 1957, Ser. No. 692,985

6 Claims. (Cl. 73—514)

(Granted under Title 35, U.S. Code (1952), sec. 266)

The invention described herein may be manufactured and used by or for the Government of the United States of America for governmental purposes without the payment of any royalties thereon or therefor.

This invention relates generally to a switching device and more particularly to a gravitational force responsive switching, or actuating, device.

In freely falling bodies, such for example as aircraft launched non-spin type ordnance vehicles, it is desirable as a safety feature that the body or vehicle be maintained inoperative for a predetermined period during the free fall thereof towards the surface of the earth. In order to accomplish this desirable operational sequence, it has been the prior practice to utilize electrical timing networks, clock-delay mechanisms, and the like. In the main these prior art devices have been relatively complex in construction, difficult to assemble, and large in size and weight.

Accordingly, a principal object of the present invention is to provide a new and improved delay actuating mechanism for freely falling vehicles.

Another object of the instant invention is the provision of a gravity sensitive actuating device operable in divers orientations thereof.

Still another object of this invention resides in the provision of a new and gravitational force responsive switching mechanism.

A further object of the present invention is to provide a gravity responsive operational control device characterized by ease and economy of manufacture and assembly, minimum of componential parts and ease, versatility of application, reliability and use.

Other objects and many of the attendant advantages of this invention will be readily appreciated as the same becomes better understood by reference to the following detailed description when considered in connection with the accompanying drawing whereon the single figure illustrates a preferred embodiment of a gravity responsive actuator according to the present invention, indicated generally by the reference numeral 11. As shown, the actuator 11 includes a pair of similarly shaped levers, or arms, 12, each being pivotally mounted upon a base plate, or support bar, 13 by means of bearing members 14. The plate 13 is firmly secured within a casing 15 of a freely falling body, such, for example, as an aircraft launched bomb or the like. Each arm 12 includes an enlarged head 16, a motion translating element, such, for example, as an L-shaped lever or bell crank 17, and an intermediate shank 18. A recess 19, preferably of frusto conical or concave configuration, is formed within each of heads 16 on the adjacent surfaces 21 thereof. The recesses 19 complement each other and are normally urged toward one another as a result of the turning moment developed about pivots 14 by the action of head 22 of spring urged rod, or linkage 23 upon levers 17. The rod is operatively coupled to a utilization device, which, by way of example, and not limitation, is illustrated as an electrical microswitch 24 having a leaf spring contact 25 adapted to be urged into engagement with stationary contact 26 upon inward movement of rod 23, thereby to effect circuit closure through the microswitch.

Movably positioned within the recesses 19 is a mass or weight 27 which is preferably of a spherical configuration. It will be understood that the weight of mass 27 when under the influence of normal gravitational force is of sufficient magnitude to balance, or overcome, the closure urging of heads 16 by resiliently urged rod 23 thereby maintaining the heads 16 normally spatially displaced, as shown, and the electrical contacts 25 and 26 of the utilization device 24 interrupted. Moreover, it will be apparent to those skilled in the art to which the instant invention relates that the interrupted status of the electrical contacts will be maintained by actuator 11 under divers orientations thereof relative to the earth's gravitational influence, such for example as indicated by directional arrows X, Y, and Z. A gravitational force acting substantially along the Y direction will result in the seating of ball 27 in the bottom portion of recesses 19, as shown, while a gravitational force acting substantially along either the X or Z directions will result in the seating of the mass 27 in the recess 19 of the arm 12 either on the left or right hand portion of the figure, as viewed in the drawing, respectively.

In response to an acceleration force of a predetermined magnitude, as may result during free fall of the casing 15 towards the surface of the earth, the effective weight of the mass 27 and arms 12 will be substantially reduced in value to a level at which the force imparted to the arms 12 by spring urged rod 23 through head 22 will dominate the effective gravitational force whereupon the heads 16 of arms 12 will be urged into a more proximate relationship. This urging of heads 16 will result in a concomitant movement of levers 17 along a direction opposite to that indicated by the Y arrow, whereupon the spring urged rod 23 will urge leaf contact 25 into engagement with stationary contact 26 of microswitch 24. Upon an increase in the magnitude of the effective gravitational force acting upon the actuator 11, the effective weight of the mass 27 will increase until the effect thereof will again overcome the spring urging of the rod 23 against the actuator 11.

Although the actuator has been described and illustrated as including only a pair of pivoted arm members 12, it is to be understood that the inclusion of a greater number of arms is contemplated, upon a need therefor. Moreover, it will be obvious to one skilled in the art that although the gravity sensitive actuator 11 has been illustrated and described as controlling the operation of an electrical device, it is not so limited, and may readily be employed to control the operation of a mechanical device, such for example as a spring urged rotor, or the like.

Obviously many modificaitons and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A multi-directional gravity responsive device comprising a support member, a plurality of bell cranks having elongated members and relatively short members pivotally arranged on said support member, a recess formed in a surface of each of said elongated members, resilient means engaging said short members for urging said elongated members toward each other, a mass movably positioned in the recesses, said mass when subjected to a normal gravitational force being adapted to overcome the urging of said means thereby to maintain said elongated members in a particular mutually spaced position and when subjected to a sub-normal gravitational force to enable movement of said elongated members by said means to a moved position, and means formed on said elongated members for effecting transmission of said movement to a utilization device.

2. A multi-directional gravity responsive actuator comprising a base plate, a plurality of elongated arms pivotally mounted upon said plate, a recess formed in each of said arms at one extremity thereof, a spherical mass movably positioned within the recesses, an extension integrally formed on each of said arms at a substantially right angle thereto and being operatively coupled to a utilization device for effecting transmission of movement of said arms thereto and resiliently urged means coupled to said extensions for urging the extremities of said arms towards each other, whereby said utilization means is actuated when said base plate is freely falling.

3. A multi-directional force responsive device comprising a support plate, a pair of levers pivotally mounted upon said plate, a recess formed upon an adjacent surface of each of said levers at one extremity thereof, a dog formed integrally upon an adjacent surface of each of said levers at the other extremity thereof, a resiliently urged stem operatively coupled to a movable utilization device, a head affixed to said stem and being in engagement with the dogs formed on each of said levers in a manner to effect urging of said one extremity of each of said levers towards one another, a mass movably retained between said levers by the recesses, said mass being adapted normally to overcome the urging effect of said head thereby to maintain said one extremity of said levers spatially displaced and in response to a reduction of effective gravitational force of a predetermined magnitude to enable movement by said stem of one extremity of each of said levers towards one another, said dogs being adapted to transmit said movement through said stem to the movable utilization device.

4. A device according to claim 3 wherein said recesses are of an arcuate configuration thereby to provide lateral retention of the mass.

5. A device according to claim 3 wherein said mass is of spherical configuration.

6. A device according to claim 3 wherein said recesses are complementary in character and of substantially identical configuration.

References Cited in the file of this patent

UNITED STATES PATENTS

| | | |
|---|---|---|
| 1,626,794 | Dieter | May 3, 1927 |
| 2,331,904 | Gustafsson et al. | Oct. 19, 1943 |
| 2,428,029 | Katcher | Sept. 30, 1947 |
| 2,464,834 | Taylor | Mar. 22, 1949 |
| 2,488,739 | Printz | Nov. 22, 1949 |

FOREIGN PATENTS

| | | |
|---|---|---|
| 569,061 | Great Britain | May 2, 1945 |